No. 773,751. PATENTED NOV. 1, 1904.
T. J. KEHOE.
MOTION TRANSMITTING MECHANISM.
APPLICATION FILED FEB. 13, 1904.
NO MODEL.
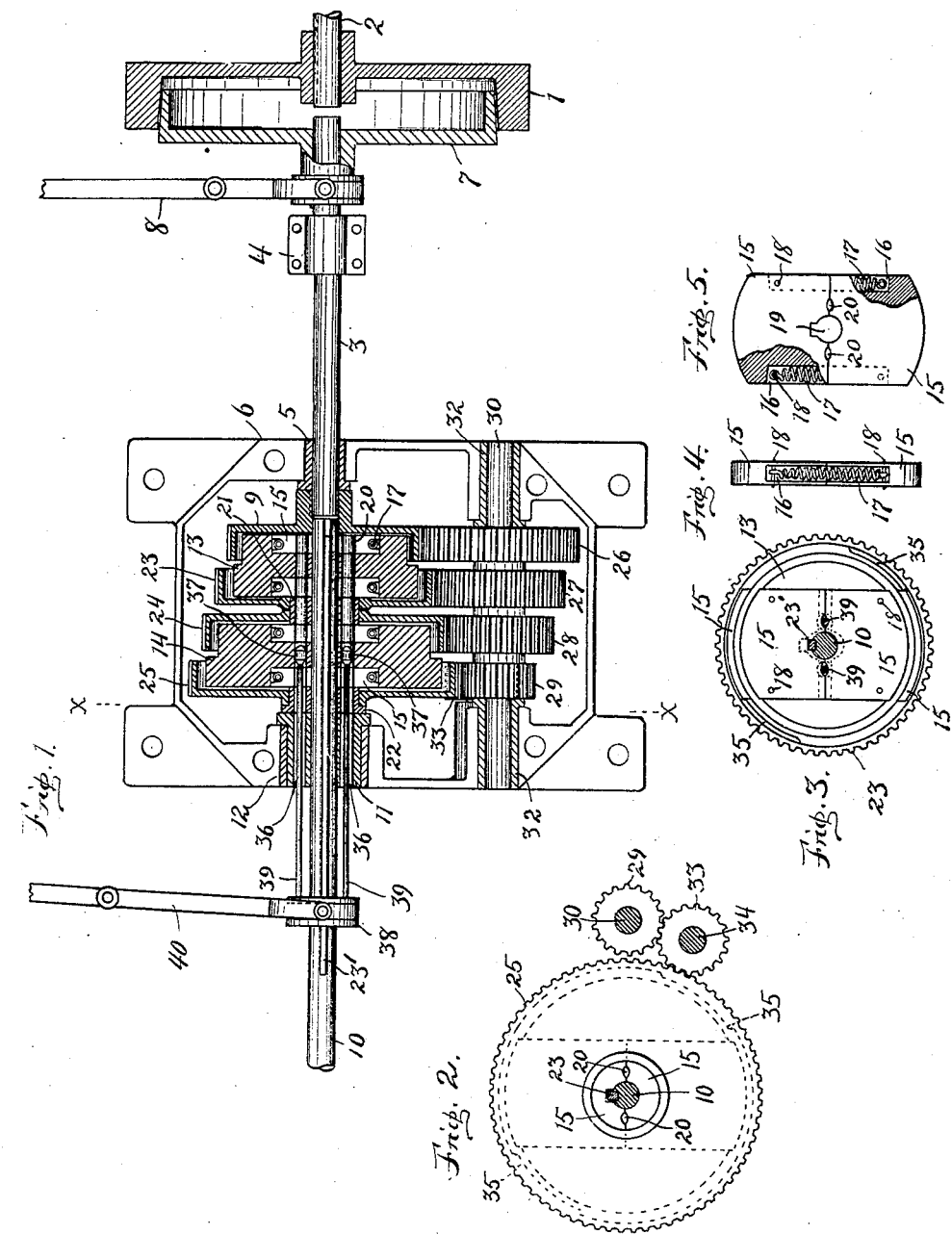
WITNESSES: Thomas J. Kehoe INVENTOR
BY
ATTORNEY No. 773,751.

Patented November 1, 1904.

UNITED STATES PATENT OFFICE.

THOMAS J. KEHOE, OF FORT WAYNE, INDIANA, ASSIGNOR, BY DIRECT AND MESNE ASSIGNMENTS, TO THE WAYNE GEAR AND MACHINE COMPANY, A CORPORATION OF INDIANA.

MOTION-TRANSMITTING MECHANISM.

SPECIFICATION forming part of Letters Patent No. 773,751, dated November 1, 1904.

Application filed February 13, 1904. Serial No. 193,430. (No model.)

*To all whom it may concern:*

Be it known that I, THOMAS J. KEHOE, a citizen of the United States, residing at Fort Wayne, in the county of Allen and State of Indiana, have invented certain new and useful Improvements in Motion-Transmitting Mechanism, of which the following is a specification, reference being had to the accompanying drawings, and to the figures of reference marked thereon, which form part of this specification.

This invention relates to improvements in motion-transmitting mechanism; and the objects thereof are to effect a construction for transmitting motion and to vary the ratio of speed or reverse the transmitted motion and also to release the driven member, all under control of a single operating-lever, and to afford such construction for the above purpose which will not necessitate the disengagement of the teeth of any one gear from those of the other gears with which the same mesh.

I accomplish my objects by the construction illustrated in the accompanying drawings, in which—

Figure 1 is a plan view of my invention, partly in cross-section. Fig. 2 is an end view of the reverse-gearing, the section being on the line *x x* of Fig. 1. Fig. 3 is an end view of one of the fixed clutch members, showing clutch-dogs in position and also one of the idle gears. Fig. 4 is an edge view of one pair of clutch-dogs. Fig. 5 is a side view of Fig. 4.

Similar numerals of reference indicate corresponding parts throughout the several views, and referring now to the same—

1 is a rotary driving member, which consists of an internal friction-wheel mounted upon an engine-shaft 2.

3 is a driving-shaft carried in bearings 4 and 5, the latter bearing being mounted in the gear-case 6. The said driving-shaft ranges in line with the shaft 2 of the driving member and has mounted thereon an external friction-wheel 7, which is adapted to engage in and be driven by the friction-wheel of the driving member. The wheel 7 is loosely keyed to said shaft 3, so that it may be slid thereon lengthwise by means of an operating-lever 8, which is suitably connected with said wheel 7. Upon the end of the said shaft 3 within said case is rigidly fixed a live clutch-wheel 9.

10 is a transmission-shaft arranged in line with the driving-shaft 3 and is supported at one end loosely in the hub of the clutch-wheel 9. The said shaft 10 extends through a rotary guide member 11, which is keyed thereon and revolves in a bearing 12, which is arranged in the case 6.

Upon the shaft 10 are rigidly fixed the clutch members 13 and 14, each of which has arranged in its respective ends a set of clutch-dogs, which consist each of two plates 15, arranged in a common plane and with their inner ends abutting. In the edges of said plates are made recesses 16, in which range coil-springs 17, the latter being secured at their respective ends to the said plates by means of pins 18. The purpose of said springs is to hold said plates together or in their idle state. The abutting ends of the plates 15 are recessed, as shown at 19, so as to form an opening for the shaft 10, and also recesses 20 are made in the ends of said plates at points upon either side of the recesses 19. The latter are for the passage of the shanks of the expanding mandrels, hereinafter mentioned. Between the said clutch members and upon the shaft 10 is rigidly mounted a collar 21, and between the clutch member 14 and the rotary guide member 11 is likewise arranged another collar, 22. A long key 23', seated in the shaft 10, extends through and engages the guide member 11, collars 21 and 22, and said clutch members 13 and 14, so that these parts will rotate together with said shaft.

Idle gears 23 and 24 are interposed between the clutch members 13 and 14 and are mounted loosely upon the collar 21, so as to rotate freely thereon, and another idle gear, 25, is likewise mounted upon the collar 22 adjacent the clutch member 14. Gears 26, 27, 28, and 29 are rigidly mounted upon a counter-shaft 30, which is mounted in the bearings 32, carried by the case 6. The gear 26 meshes with and is driven by the said clutch-wheel 9, the latter being externally toothed, and the gears 27 and 28 mesh with and drive the idle gears 23 and 24, respectively. An intermediate gear 33 is mounted upon a stud 34, which is carried by the case 6, and said gear meshes with the gear 29 and idle gear 25. It will be understood that the idle gear 25 will therefore be driven in the reverse direction from that of the former idle gears and clutch-wheel 9.

The flanges of the clutch-wheel 9 and idle gears 23, 24, and 25 overhang, respectively, the adjacent ends of the clutch members 13 and 14, and lugs 35 project from the under sides of said flanges, which are adapted to engage the respective clutch-dogs 15 when said clutch-dogs are accordingly adjusted. The said lugs 35 are shown in connection with the idle gear 23 in Fig. 3 and are also indicated by dotted line in connection with the idle gear 25 in Fig. 2. However, similar lugs are arranged in each of the idle gears and in the clutch-wheel 9, all of which engage the respective clutch-dogs in the same manner.

Guide-openings 36, ranging parallel with the shaft 10, extend through the guide member 11, collars 21 and 22, and the clutch members 13 and 14, and the recesses 20 in the clutch-dogs 15 register in line with said openings. Within said openings 36 extend the expanders 37, which are connected with and operated by a collar 38, the latter being movably mounted upon the shaft 10, so as to adjust said expanders lengthwise in said openings. The ends of said expanders 37 are enlarged practically to the extent of the diameters of said openings, and the recesses 20, between the plates 15 of the clutch-dogs, are comparatively smaller than the enlarged ends of the expanders. It will therefore appear that when the said enlarged ends of said expanders are adjusted in the said recesses 20 of any of the said clutch-dogs the plates 15 thereof will thereby be forced apart. It is when so forced apart that said dogs become engaged by the lugs 35 of the respective idle gears and clutch-wheel, as before mentioned. The said recesses are, however, of sufficient capacity to pass the shanks 39 of said expanders without causing the plates to spread. A lever 40 is suitably connected with the collar 38 for operating the said expanders, and by manipulating said lever it is obvious any of said clutch-dogs may be expanded, so as to become engaged by their respective idle gears or clutch-wheel, as the case may be.

In the operation of my invention when the shaft 3 is rotated the clutch-wheel 9 is thereby driven, which in turn drives the gear 26. The counter-shaft 30 is therefore rotated, and the said idle gears, having geared connection therewith, are also rotated, but at various ratios of speed, dependent upon the comparative diameters of the said gears and idle gears with which they mesh. Unless one of the clutch-dogs is expanded the shaft 10 will remain at rest. It will be understood that the clutch members are fixed upon the shaft 10 and that the idle gears rotate continuously thereon at various speeds and that the speed of the shaft 10 will necessarily be the same as that of the idle gear or clutch-gear with which said shaft is placed in driven connection by means of the respective clutch-dogs.

Example: If the clutch-dog in the member 13 next the clutch-wheel is expanded, the said clutch-wheel will engage said clutch-dog and the shaft will be driven directly thereby, and as the other clutch-dogs are expanded, which of course is done severally, they are engaged by the respective idle gears, and the shaft will thereby be rotated with the same speed as the idle gear thus engaged.

Having described my invention, what I claim as new, and desire to secure by Letters Patent, is—

1. In mechanism of the class described, a driving-shaft; a clutch-wheel fixed upon said shaft; a transmission-shaft arranged in line with the former shaft; a counter-shaft having connection with said clutch-wheel by which said counter-shaft is driven; fixed clutch members rigidly mounted upon said transmission-shaft; idle gears carried by said transmission-shaft and having connections respectively with said counter-shaft by which said idle gears are driven; and means carried by said fixed clutch members to severally engage the respective idle gears.

2. In mechanism of the class described, a driving-shaft; a counter-shaft in driving connection with said driving-shaft; a transmission-shaft in line with said driving-shaft; fixed clutch members rigidly mounted upon said transmission-shaft; a series of idle gears of various diameters carried by said transmission-shaft and each having driving connection with said counter-shaft; and means carried by said fixed clutch member to severally engage the respective idle gears.

3. In mechanism of the class described, a driving-shaft; a transmission-shaft in line with said driving-shaft; a counter-shaft having connection with said driving-shaft to be driven thereby; a set of clutch-dogs carried by each of several fixed clutch members which are rigidly mounted upon said transmission-shaft; a series of idle gears carried by said transmission-shaft and each having connection with said counter-shaft to be actuated thereby, and being adapted to be engaged by said clutch-dogs respectively; and means in movable connection with said transmission-shaft to severally operate said clutch-dogs.

4. In mechanism of the class described, a driving-shaft; a transmission-shaft in line with the driving-shaft; a clutch-wheel on said driving-shaft; a counter-shaft parallel with the transmission-shaft; clutch members rigidly mounted on the transmission-shaft; a series of idle gears carried by the transmission-shaft and each having connection with the counter-shaft to be actuated thereby; a set of clutch-dogs carried by each of said clutch members and being adapted to engage said idle gears and clutch-wheel respectively; and means in movable connection with said transmission-shaft to severally operate said sets of clutch-dogs.

5. In mechanism of the class described, a driving-shaft; a transmission-shaft in line with the driving-shaft; a counter-shaft in connection with the driving-shaft to be actuated thereby; a series of clutch members rigidly mounted on the transmission-shaft; a set of clutch-dogs mounted in each of said clutch members; collars arranged upon the transmission-shaft adjacent the clutch members; idle gears mounted to rotate upon said collars and having connections with the counter-shaft to be actuated thereby and being adapted to be engaged by said clutch-dogs respectively; and adjustable means carried by the transmission-shaft and being adapted to severally operate said sets of clutch-dogs.

6. In mechanism of the class described, a driving-shaft; a transmission-shaft in line with the driving-shaft; a counter-shaft in connection with the driving-shaft to be actuated thereby; a clutch-wheel mounted on the driving-shaft; collars mounted on the transmission-shaft; idle gears mounted on said collars and each having connection with the counter-shaft to be actuated thereby; clutch members rigidly mounted upon the transmission-shaft; a set of clutch-dogs carried by each of said clutch members and being adapted to be engaged respectively with the idle gears and said clutch-wheel; and means movably mounted in said collars and clutch members and being adapted to severally operate said sets of clutch-dogs.

In testimony whereof I affix my signature in presence of two witnesses.

THOMAS J. KEHOE.

Witnesses:
W. G. BURNS,
R. J. ARANTZ.